(12) United States Patent
Park et al.

(10) Patent No.: US 8,743,398 B2
(45) Date of Patent: Jun. 3, 2014

(54) USING A BUTTON PROVIDED IN AN IMAGE FORMING APPARATUS TO START A WI-FI PROTECTED SETUP

(75) Inventors: Sung-joon Park, Hwaseong-si (KR); Jin-hyung Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 199 days.

(21) Appl. No.: 13/047,352

(22) Filed: Mar. 14, 2011

(65) Prior Publication Data

US 2012/0044522 A1  Feb. 23, 2012

(30) Foreign Application Priority Data

Aug. 23, 2010 (KR) .................. 10-2010-0081550

(51) Int. Cl.
*G06F 3/12* (2006.01)
(52) U.S. Cl.
USPC ..................................... 358/1.15

(58) Field of Classification Search
USPC ........................................... 358/1.15
See application file for complete search history.

(56) References Cited

U.S. PATENT DOCUMENTS

2002/0054345 A1* 5/2002 Tomida et al. ............ 358/1.15
2010/0165879 A1* 7/2010 Gupta et al. .............. 370/254

FOREIGN PATENT DOCUMENTS

EP          2112844 A2    10/2009

* cited by examiner

*Primary Examiner* — Eric A Rust
(74) *Attorney, Agent, or Firm* — Sughrue Mion, PLLC

(57) ABSTRACT

A method and apparatus for setting up a wireless LAN. The method includes receiving a packet, which informs a user that a WPS (Wi-Fi Protected Setup) button of an access point is operated, from the access point; activating a button provided in an image forming apparatus as a WPS button; selecting a button activated as the WPS button; and if the button activated as the WPS button is selected, establishing a wireless network with the access point.

16 Claims, 7 Drawing Sheets

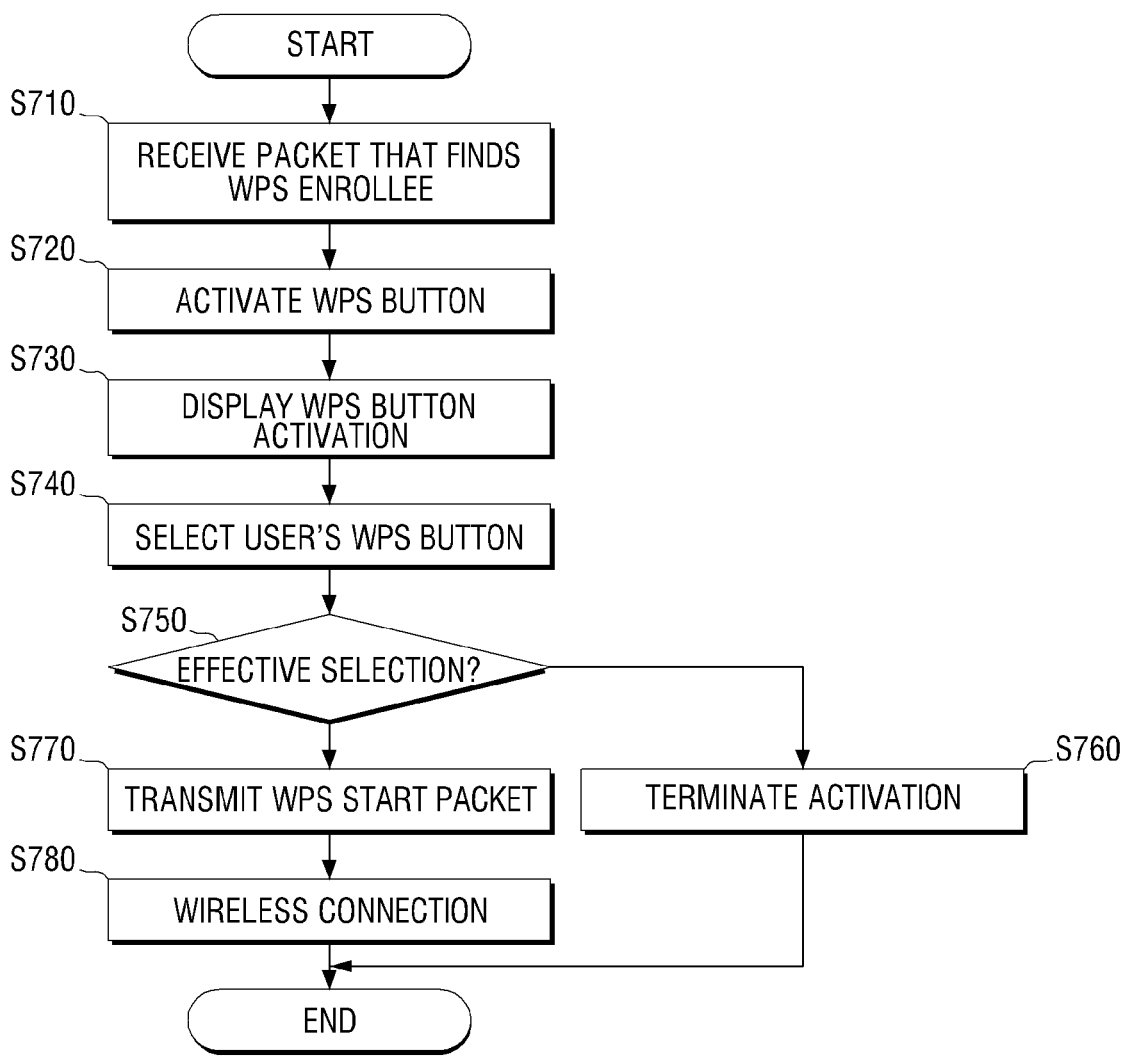

USING A BUTTON PROVIDED IN AN IMAGE FORMING APPARATUS TO START A WI-FI PROTECTED SETUP

CROSS-REFERENCE TO RELATED APPLICATION

This application claims priority under from Korean Patent Application No. 10-2010-0081550, filed on Aug. 23, 2010, in the Korean Intellectual Property Office, the disclosure of which is incorporated herein by reference in its entirety.

BACKGROUND OF THE INVENTION

1. Field

Methods and apparatuses consistent with exemplary embodiments generally relate to an image forming apparatus and a method for setting a wireless local area network (LAN) thereof, and more particularly, to an image forming apparatus and a method for setting a wireless LAN thereof, which can use various kinds of buttons provided in the image forming apparatus as WPS (Wi-Fi Protected Setup) buttons.

2. Description of the Related Art

An image forming apparatus means an apparatus that prints print data generated in a terminal device such as a computer on a print paper. Examples of such an image forming apparatus include a copy machine, a printer, a facsimile, a multifunctional peripheral (MFP) that multiply implements functions of these devices through one device, and the like.

Although an image forming apparatus in the related art performs communication with a print control terminal device in a wired method, a recent image forming apparatus is wirelessly connectable with a print control terminal device using a wireless LAN. A currently used wireless LAN generally follows IEEE 802.11 standard.

On the other hand, a WPS (Wi-Fi Protected Setup) means a Wi-Fi standard protocol for easy wireless security setting. Such a WPS protocol provides a means for simply setting a wireless setting in an access point by communicating with a wireless connection device through a user authentication method such as PBC (Push Button Configuration), PIN (Personal Identification Number), or the like. The WPS protocol is a standard means which enables a user who has difficulty in performing wireless security setting to easily perform the wireless setting.

Although the WPS function can be easily provided through a GUI in a device such as a desktop computer or a mobile, it is not easy to provide a user the WPS function in an image forming apparatus that has a limited display means. In order to overcome this point, a recent image forming apparatus is provided with a dedicated WPS button to support the WPS function.

However, the WPS function has the problem that its utility is lowered in spite of cost increase that occurs as a WPS-dedicated button is added, on the point that the WPS function is used at an initial stage of constructing a wireless environment, but is not used any further, except for reconnection, in a state where the wireless setting is completed and the wireless communication is possible.

Also, if a WPS button is pressed due to a user's mistake in spite of the situation in which the wireless environment is not being constructed, in the related art, the currently connected wireless connection may be disconnected or become non-connectable.

SUMMARY

Exemplary embodiments may address at least the above problems and/or disadvantages, as well as other disadvantages not described above, and may provide at least the advantages described below. Accordingly, an aspect of the present invention provides an image forming apparatus and a method for setting a wireless LAN in the image forming apparatus, which can use various kinds of buttons provided in the image forming apparatus as WPS (Wi-Fi Protected Setup) buttons.

According to one aspect of the exemplary embodiments, a method for setting a wireless network in an image forming apparatus that is connectable with an access point includes receiving a signal for starting a Wi-Fi Protected Setup (WPS) function; activating a button provided in the image forming apparatus as a WPS button; and if the button activated as the WPS button is selected, establishing a wireless network with the access point.

The signal may be a packet that includes at least one of information of a selected register and information of a device password ID.

The method for setting a wireless network according to an exemplary embodiment may further include displaying that the button is activated as the WPS button when the button is activated as the WPS button.

The method for setting a wireless network according to an exemplary embodiment may further include terminating the activation of the button activated as the WPS button if a predetermined time elapses after the button is activated as the WPS button or the image forming apparatus is wirelessly connected to the access point.

The button may perform a predetermined inherent function, and the activation step may include replacing the inherent function with the WPS function for a predetermined time after the signal is received.

The activation step may include determining whether the image forming apparatus is wirelessly connected to the access point, and activating the button as the WPS button based on the determination.

The method for setting a wireless network according to an exemplary embodiment may further include determining whether the image forming apparatus is wirelessly connected to the access point if the button activated as the WPS button is selected; and if the image forming apparatus is wirelessly connected to the access point, confirming whether the selection of the button activated as the WPS button is for a WPS process.

The button of the image forming apparatus may be at least one button of a power button, a cancel button, and a print button.

The image forming apparatus may be provided with a plurality of buttons, and the activation step may include activating all the plurality of buttons as WPS buttons.

According to another aspect, an image forming apparatus that is connectable with an access point includes a communication interface unit receiving a signal for starting a WPS (Wi-Fi Protected Setup) function; an input unit including buttons for receiving a selection input; and a control unit activating a button provided in the image forming apparatus as a WPS button; wherein if the button activated as the WPS button is selected, the control unit establishes a wireless network with the access point.

The signal may be a packet that includes at least one of information related to a selected register and information related to a device password ID.

The image forming apparatus according to an exemplary embodiment may further include a display unit displaying that the button is activated as the WPS button when the button is activated as the WPS button.

The control unit may terminate the activation of the button activated as the WPS button if one of a predetermined time elapses after the button is activated as the WPS button and the image forming apparatus is wirelessly connected to the access point.

The button may perform a predetermined inherent function, and the control unit may replace the inherent function with the WPS function for a predetermined time after the signal is received.

The control unit may determine whether the image forming apparatus is wirelessly connected to the access point, and may activate the button as the WPS button based on the determination.

The control unit may determine whether the image forming apparatus is wirelessly connected to the access point if the button activated as the WPS button is selected, and if the image forming apparatus is wirelessly connected to the access point, the control unit may confirm whether the selection of the button activated as the WPS button is for a WPS process.

The button may be at least one button of a power button, a cancel button, and a print button.

The input unit is provided with a plurality of buttons, and the control unit activates all the plurality of buttons as WPS buttons.

BRIEF DESCRIPTION OF THE DRAWINGS

The above and other aspects of exemplary embodiments will be more apparent from the following detailed description when taken in conjunction with the accompanying drawings, in which:

FIG. 7 is a flowchart illustrating a method for setting a wireless LAN according to an exemplary embodiment.

DETAILED DESCRIPTION OF EXEMPLARY EMBODIMENTS

Figure 1:
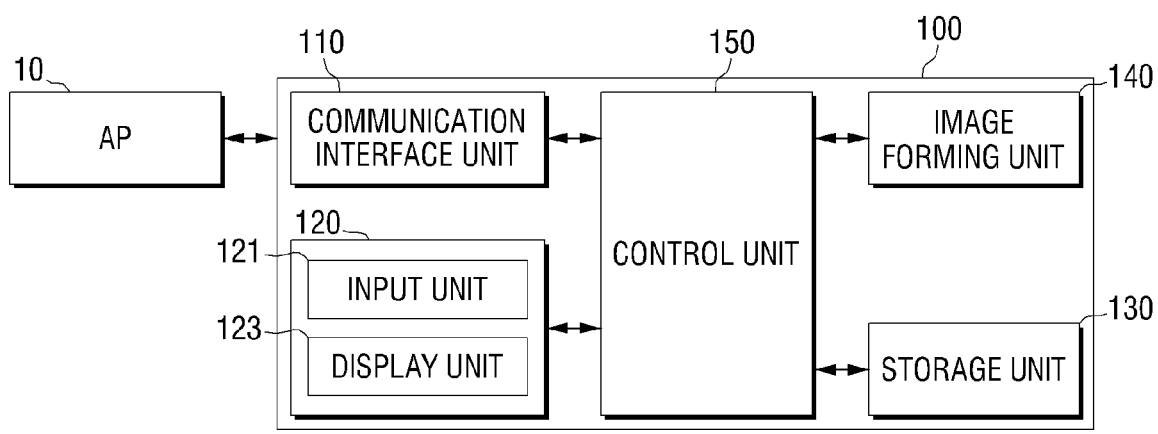
FIG. 1 is a block diagram illustrating the configuration of an image forming apparatus according to an exemplary embodiment.

Exemplary embodiments are described in detail with reference to the accompanying drawings.

In the following description, the same or similar reference numerals may be used for the same or similar elements when they are illustrated in different drawings. Detailed descriptions of constructions or processes known in the art may be omitted to avoid obscuring the subject matter of exemplary embodiments.

FIG. 1 is a block diagram illustrating the configuration of an image forming apparatus according to an exemplary embodiment.

Referring to FIG. 1, an image forming apparatus 100 includes a communication interface unit 110, a user interface unit 120, a storage unit 130, an image forming unit 140, and a control unit 150.

The communication interface unit 110 may be wirelessly connected with an access point 10 using a WPS protocol. Specifically, the communication interface unit 110 may receive a signal for starting a WPS (Wi-Fi Protected Setup) function from the access point 10. In this case, the signal received from the access point 10 may be a "packet finding a WPS enrollee" which reports that a WPS (Wi-Fi Protected Setup) button of the access point 10 has operated. Specifically, the packet finding a WPS enrollee may include WPS information such as "selected register", "device password ID", and the like. Information included in the signal transmitted by the access point 10 will be described later with reference to FIGS. 3 and 4.

Also, the communication interface unit 110 may transmit a WPS start packet to the access point 10. Specifically, if a WPS button of an input unit 121 to be described later is selected, the communication interface unit 110 may transmit the WPS start packet to the access point 10 that has transmitted a "signal for starting the WPS (Wi-Fi Protected Setup) function". Through this, the access point 10 and the image forming apparatus start a WPS protocol, and the communication interface unit 110 can receive a wireless communication parameter from the access point through a predefined WPS protocol regulation.

If the image forming apparatus is wirelessly connected to the access point 10, the communication interface unit 110 can receive print data from the access point 10. Specifically, in the case where the access point 10 is a print control terminal device, the communication interface unit 110 can directly receive print data from the access point. On the other hand, in the case where the image forming apparatus is connected to the print control terminal device through the access point 10 (that is, in the case where the access point 10 serves as a router), the communication interface unit 110 can receive the print data from the print control terminal device through the access point 10.

The user interface unit 120 is provided with a plurality of function keys through which a user can set or select various kinds of functions supported by the image forming apparatus, and displays various kinds of information provided from the image forming apparatus 100. The user interface unit 120 may include an input unit 121 and a display unit 123.

The input unit 121 receives an input of a user's selection. Specifically, the input unit 121 may include buttons provided at an upper end or on the front surface of the image forming apparatus 100, such as a power button, a cancel button, a print button, and the like.

Here, the power button is a button that can be selected by a user to turn on or off the power of the image forming apparatus 100, and the cancel button is a button that can be selected by the user to cancel the existing selection. The print button is a button that can be selected by the user to print an image displayed on the print control terminal device (not illustrated) or to resume a print job that is in a standby state. In an exemplary embodiment, the use of the power button, the cancel button, and the print button is exemplified. However, other buttons provided in the image forming apparatus 100 may also be used in addition to the power button, the cancel button, and the print button.

The display unit 123 displays whether the button is used for the WPS function or a preset inherent function of the button. Specifically, if the button of the input unit 121 is activated as the WPS button, the display unit 123 can display that the corresponding button operates as the WPS button. The display unit 123 may be implemented by LED or an LCD window. The detailed shape of the display unit 123 will be described layer with reference to FIGS. 5 and 6.

The storage unit 130 stores information related to the wireless connection. Specifically, the storage unit 130 receives WPS information received during the wireless connection procedure with the access point 10.

On the other hand, the storage unit 130 may be implemented by a storage medium within the image forming apparatus 100 and an external storage medium, for example, a removable disk including a USB memory, a web server through a network, or the like.

The image forming unit 140 performs a printing task. Specifically, the image forming unit 140 may perform a series of processes of outputting the print data received through the communication interface 110 through a print engine.

The control unit 150 controls respective configurations in the image forming apparatus 100. Also, the control unit 150 may set a wireless connection with the access point 10. Specifically, if a signal for starting the WPS (Wi-Fi Protected Setup) function is received from the access point 10, the control unit 150 may activate all buttons of the input unit 121 as WPS buttons. Here, the term "activation" means the replacement of the predetermined inherent function of the buttons with the WPS functions.

A user can perform the WPS connection by selecting the button activated as the EPS button. If a user selects the button activated as the WPS button, the control unit 150 controls the communication interface unit 110 so as to make a wireless connection with the access point.

Also, the control unit 150 may terminate the activation of the WPS button. Specifically, if a predetermined time, for example, a time for 120 seconds, elapses after the activation of the WPS button, or the image forming apparatus has already been wirelessly connected with the access point 10, the control unit 150 may terminate the WPS activation of the button. That is, the button that performs the WPS function may be made to perform the preset inherent function.

Also, the control unit 150 may determine whether the image forming apparatus is wirelessly connected with the access point 10. Specifically, if the image forming apparatus and the access point 10 have already been wirelessly connected with each other, the control unit 150 may make the button of the input unit 121 not activated as the WPS button even if the signal that reports the WPS activation is received from the access point 10 so that the reconnection process is not performed even if the WPS button of the access point is pressed. Also, the control unit 150 can confirm whether a button activated as the WPS button is selected in a state where the image forming apparatus and the access point are wirelessly connected with each other and whether the user's selection of the WPS button is for the WPS process.

As described above, the image forming apparatus 100 according to an exemplary embodiment uses the buttons basically provided in the image forming apparatus as the WPS buttons, and thus the cost for additionally providing WPS buttons can be saved. Also, since the basic buttons are used as the WPS buttons only at the point where the WPS activation is required, the user's confusion due to an unnecessary selection of the WPS button can be removed, and thus the user convenience is improved.

Figure 2:
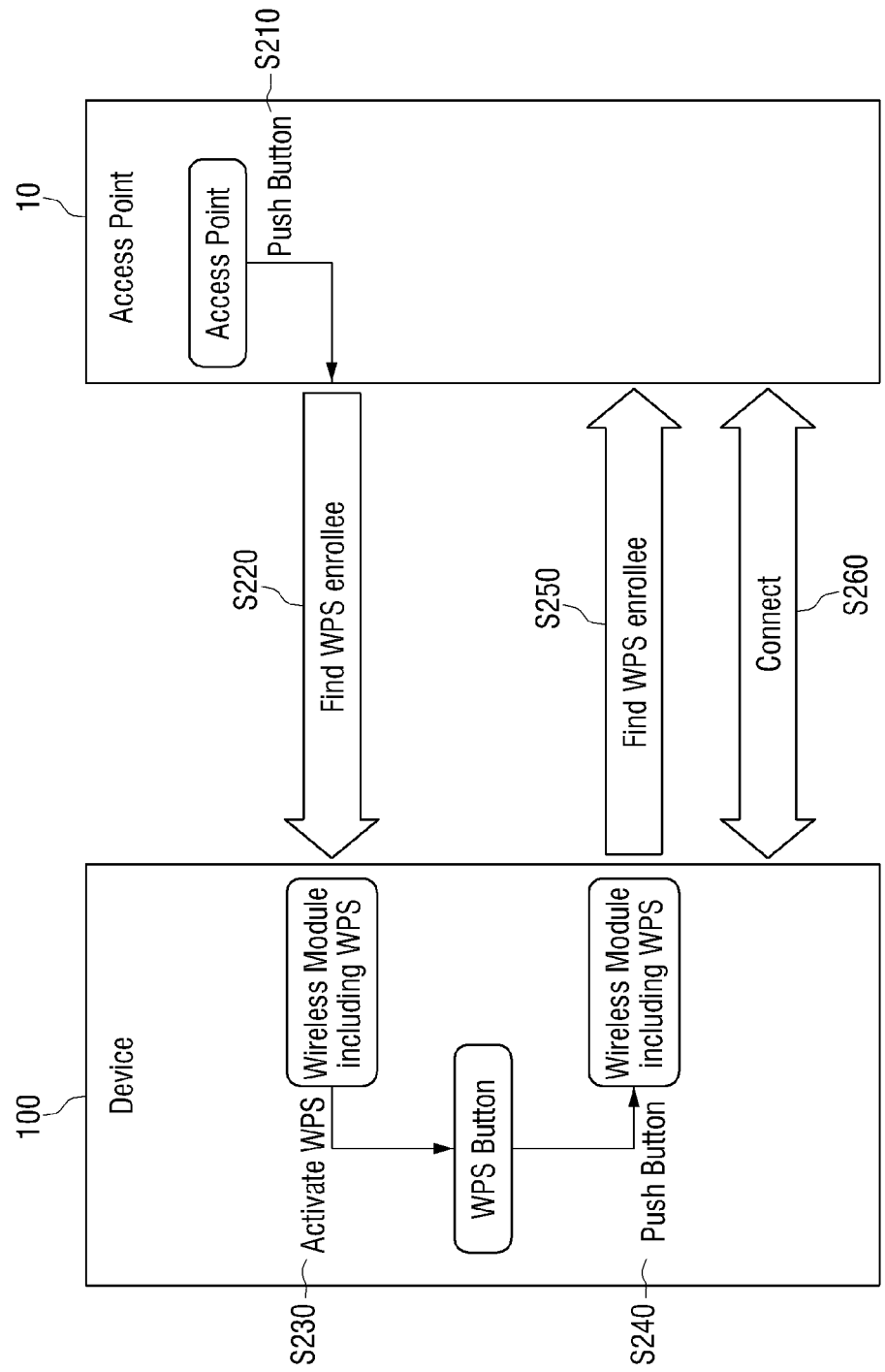
FIG. 2 is a diagram illustrating a wireless connection process between an image forming apparatus according to an exemplary embodiment and an access point.

FIG. 2 is a diagram illustrating a wireless connection process between an image forming apparatus according to an exemplary embodiment and an access point.

Referring to FIG. 2, if a user presses the WPS button positioned on the access point 10 for the WPS operation (step S210), the access point 10 may transit a packet for finding a device to be connected with by WPS in unicast or broadcast method (step S220). Specifically, the packet for finding the device to be accessed by WPS may include a broadcast type beacon packet, and the packet for finding the device to be accessed by WPS may be included in a unicast type probe response packet. In this case, the transferred packet may include information as illustrated in FIG. 4.

Also, if the image forming apparatus 100 receives the packet for finding the device to be accessed by WPS, the image forming apparatus 100 determines that the access point 10 is ready to access the WPS, and may activate at least one of the buttons provided in the image forming apparatus 100 as the WPS button (step S230). At this time, the image forming apparatus 100 can display that at least one of the buttons provided in the image forming apparatus 100 has been activated as the WPS button.

If a user selects the button activated as the WPS button (step S240), the image forming apparatus 100 transmits a WPS start packet to the access point 10 (step S250), and the access point that has received the WPS start packet can perform the WPS wireless connection with the image forming apparatus 100. Specifically, if the WPS start packet is transmitted to the access point, the access point 10 and the image forming apparatus 100 perform the WPS protocol through a predefined WPS protocol regulation, and the image forming apparatus 100 decodes and stores the received final wireless communication parameter. Using the stored wireless communication parameter, the image forming apparatus 100 and the access point 10 can be wirelessly connected with each other.

Figure 3:
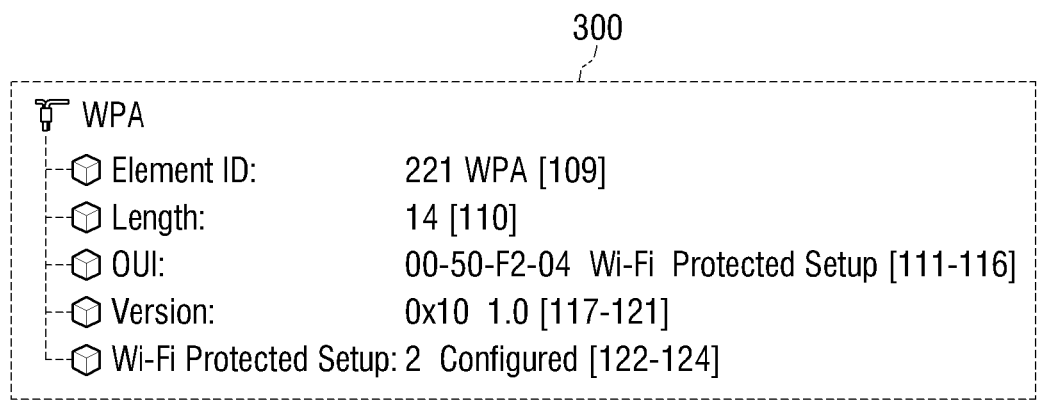
FIGS. 3 and 4 are diagrams illustrating an example of information that is transferred by an access point.
Figure 4:
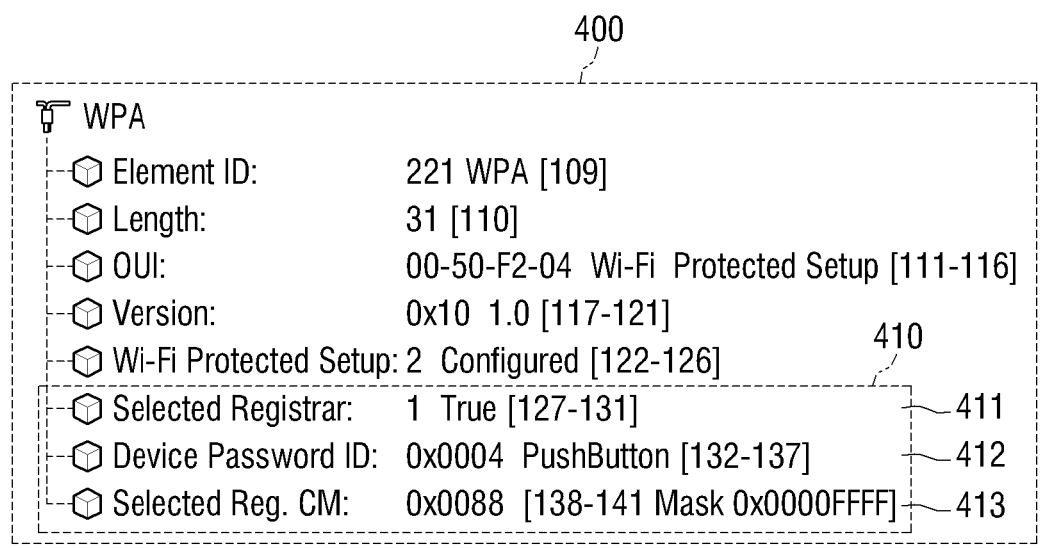

FIGS. 3 and 4 are diagrams illustrating an example of information that is transferred by an access point 10.

Specifically, FIG. 3 shows an example of a packet that is transmitted before the WPS button is operated, and FIG. 4 shows an example of a packet that is transmitted after the WPS button is operated.

Comparing FIGS. 3 and 4 with each other, if the WPS button of the access point 10 is pressed, the access point 10 can confirm the transfer of the packet that includes the WPS information, such as the selected register, device password ID, selected reg., and the like, to the image forming apparatus 100. On the other hand, referring to FIG. 4, it can be confirmed that the device password ID is set to "0x0004", and in this case, the value of "0x0004" means "push button".

Figure 5:
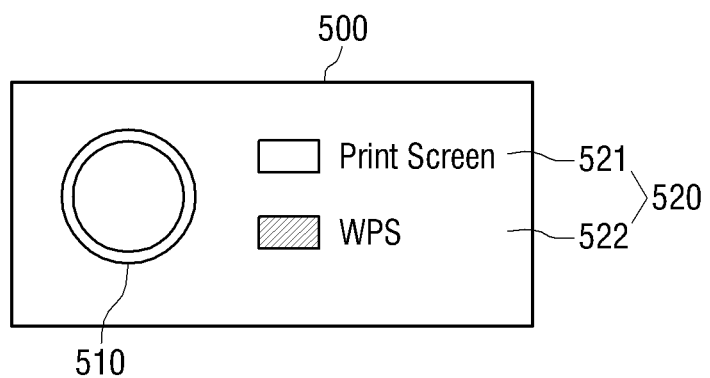
FIGS. 5 and 6 are diagrams illustrating a configuration example of a display unit according to an exemplary embodiment.
Figure 6:
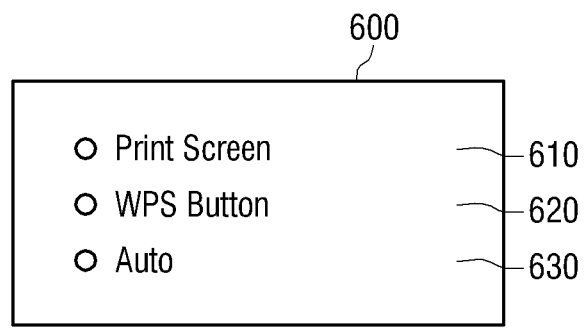

FIGS. 5 and 6 are diagrams illustrating examples of a display unit according to an exemplary embodiment.

Referring to FIG. 5, a manipulation panel 500 includes a print button 510 and a display unit 520.

The print button 510 is a button that a user can select in order to print an image that is displayed on the print control terminal device (not illustrated). Also, the print button 510 may be operated as the WPS button in accordance with the activation of the WPS button. In the illustrated example, only a "print button" is illustrated, but other buttons such as a "power button" or "cancel button" may also be operated as the WPS buttons.

The display unit 520 is configured to display whether the print button 510 is activated as the WPS button. Specifically, the display unit 520 includes a "print screen" region 521 and a "WPS" region 522.

The "print screen" region 521 is a region which informs a user that the current print button 510 is operated with its original function, and the "WPS" region 522 is a region which informs a user that the print button 510 is operated as the WPS button. In the illustrated example, whether the button is activated as the WPS button is displayed using two regions 521 and 522. However, the activation/deactivation of the WPS button may be displayed using LED that displays various colors in one region.

On the other hand, the display unit 520 may be implemented in the form as illustrated in FIG. 6. Specifically, referring to FIG. 6, the display unit 600 includes a "print screen" region 610, a "WPS button" region 620, and an "auto" region 630.

The "print screen" region 610 is a region which informs a user that the button is operated as a print button which is its original function, and the "WPS button" region 620 is a region which informs a user that the button is operated as the WPS button.

Also, the "auto" region is a region which informs a user that the function of the current button is automatically changed according to the WPS activation.

In FIGS. 5 and 6, it is illustrated that the input unit is implemented by mechanical buttons. However, the input unit may be implemented by buttons on a touch pad on which the input unit and the output unit are combined into one configuration.

FIG. 7 is a flowchart illustrating a method for setting a wireless LAN according to an exemplary embodiment.

First, a signal for starting the WPS (Wi-Fi Protected Setup) function is received from the access point 10 (step S710). Specifically, if a packet that includes information such as a selected register, a device password ID, and the like is received from the access point 10, it can be determined that the access point 10 is ready to access the WPS.

Thereafter, the buttons provided in the image forming apparatus 100 is activated as the WPS button (step S720). Specifically, if it is determined that the access point 10 is ready to access the WPS, at least one button among buttons provided in the image forming apparatus can be activated as the WPS button. In implementation, all buttons of the image forming apparatus may be implemented to be activated as the WPS buttons. In this case, the buttons of the image forming apparatus may be a power button, a cancel button (or function button), or a print button.

Thereafter, it is displayed that the button provided in the image forming apparatus has been activated as the WPS button (step S740). Specifically, it can be displayed that at least one of the buttons provided in the image forming apparatus has been activated as the WPS button through a display window as shown in FIGS. 5 and 6.

If a user selects the button that has been activated as the WPS button (step S740), it can be determined whether the user's button selection is effective (step S750). Specifically, if the user's button selection is made after a predetermined time elapses, the wireless connection may not be performed in the case where the button is selected in an already wirelessly connected state. In this state, the activation of the activated WPS button may be terminated (step S760).

On the other hand, if the user's button selection is effective, wireless connection with the access point 10 is performed. Specifically, a WPS start packet is transmitted to the access point (step S770), and after the transmission of the WPS start packet, the WPS protocol is performed according to the predefined WPS protocol regulation. At this time, the image forming apparatus 100 decodes and stores the received final wireless communication parameter, and the image forming apparatus 100 and the access point 10 can be wirelessly connected using the stored wireless communication parameter (step S780).

According to the method for setting a wireless LAN according to an exemplary embodiment, the buttons basically provided in the image forming apparatus are used as the WPS buttons, and thus the cost for additionally providing the WPS buttons can be saved. Also, since the WPS button function is activated and provided only at a point where the WPS button is required, the user's confusion due to an unnecessary selection of the WPS button can be removed, and thus the user convenience is improved. The method for setting a wireless LAN as illustrated in FIG. 7 may be executed on the image forming apparatus having the configuration of FIG. 1 or another image forming apparatus having different configuration.

While exemplary embodiments have been shown and described, it will be understood by those skilled in the art that various changes in form and detail may be made therein without departing from the spirit and scope of exemplary embodiments of the invention, as defined by the appended claims.

What is claimed is:

1. A method for setting a wireless network in an image forming apparatus that is connectable with an access point, the method comprising:
   receiving a signal for starting a Wi-Fi Protected Setup (WPS) function;
   activating a button provided in the image forming apparatus as a WPS button; and
   if the button activated as the WPS button is selected, establishing the wireless network with the access point,
   wherein the activating comprises determining whether the image forming apparatus is wirelessly connected to the access point, and activating the button as the WPS button based on the determination.

2. The method as claimed in claim 1, wherein the signal is a packet that includes at least one of information related to a selected register and information related to a device password ID.

3. The method as claimed in claim 1, further comprising displaying that the button is activated as the WPS button when the button is activated as the WPS button.

4. The method as claimed in claim 1, further comprising terminating the activation of the button activated as the WPS button if one of a predetermined time elapses after the button is activated as the WPS button and the image forming apparatus is wirelessly connected to the access point.

5. The method as claimed in claim 1, wherein the button is a button for performing a predetermined inherent function, and
   the activating comprises replacing the inherent function with the WPS function for a predetermined time after the signal is received.

6. The method as claimed in claim 1, wherein the button of the image forming apparatus is at least one of button of a power button, a cancel button, and a print button.

7. The method as claimed in claim 1, wherein the image forming apparatus is provided with a plurality of buttons, and
   the activating comprises activating all the plurality of buttons as WPS buttons.

8. A method for setting a wireless network in an image forming apparatus that is connectable with an access point, the method comprising:
   receiving a signal for starting a Wi-Fi Protected Setup (WPS) function;
   activating a button provided in the image forming apparatus as a WPS button;
   if the button activated as the WPS button is selected, establishing the wireless network with the access point,
   determining whether the image forming apparatus is wirelessly connected to the access point if the button activated as the WPS button is selected; and
   if the image forming apparatus is wirelessly connected to the access point, confirming whether the selection of the button activated as the WPS button is for a WPS process.

9. An image forming apparatus that is connectable with an access point comprising:
   a communication interface unit receiving a signal for starting a WPS (Wi-Fi Protected Setup) function;
   an input unit including buttons for receiving a selection input; and a control unit activating a button provided in the image forming apparatus as a WPS button;

wherein if the button activated as the WPS button is selected, the control unit establishes a wireless network with the access point, and wherein the control unit determines whether the image forming apparatus is wirelessly connected to the access point, and activates the button as the WPS button based on the determination.

10. The image forming apparatus as claimed in claim 9, wherein the signal is a packet that includes at least one of information related to a selected register and information related to a device password ID.

11. The image forming apparatus as claimed in claim 9, further comprising a display unit displaying that the button is activated as the WPS button when the button is activated as the WPS button.

12. The image forming apparatus as claimed in claim 9, wherein the control unit terminates the activation of the button activated as the WPS button if one of a predetermined time elapses after the button is activated as the WPS button and the image forming apparatus is wirelessly connected to the access point.

13. The image forming apparatus as claimed in claim 9, wherein the button is a button for performing a predetermined inherent function, and the control unit replaces the inherent function with the WPS function for a predetermined time after the signal is received.

14. The image forming apparatus as claimed in claim 9, wherein the button is at least one button of a power button, a cancel button, and a print button.

15. The image forming apparatus as claimed in claim 9, wherein the input unit is provided with a plurality of buttons, and the control unit activates all the plurality of buttons as WPS buttons.

16. An image forming apparatus that is connectable with an access point comprising:

a communication interface unit receiving a signal for starting a WPS (Wi-Fi Protected Setup) function;

an input unit including buttons for receiving a selection input; and a control unit activating a button provided in the image forming apparatus as a WPS button:

wherein if the button activated as the WPS button is selected, the control unit establishes a wireless network with the access point, wherein the control unit determines whether the image forming apparatus is wirelessly connected to the access point if the button activated as the WPS button is selected, and if the image forming apparatus is wirelessly connected to the access point, the control unit confirms whether the selection of the button activated as the WPS button is for a WPS process.

* * * * *